Patented Sept. 2, 1941

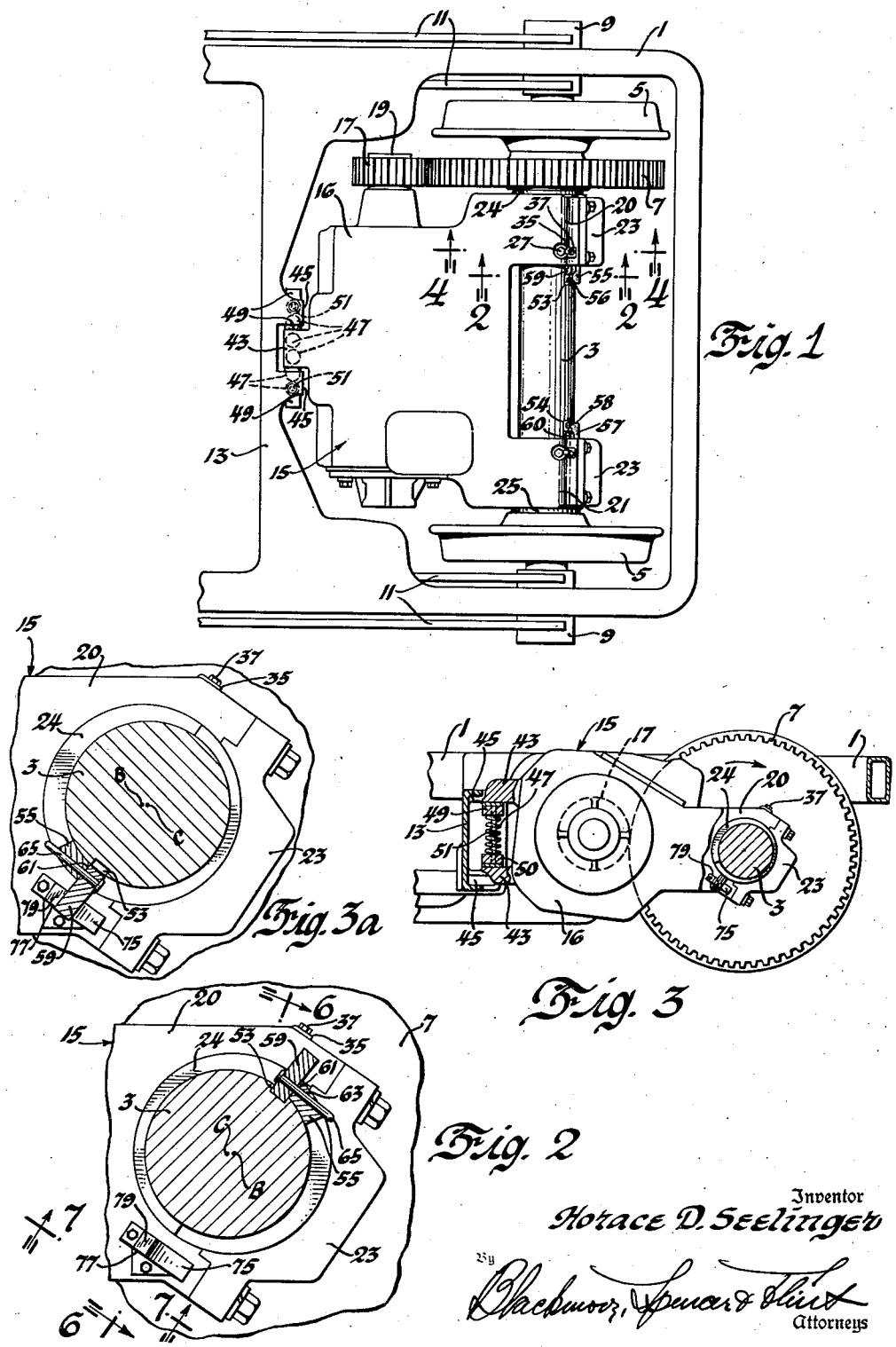

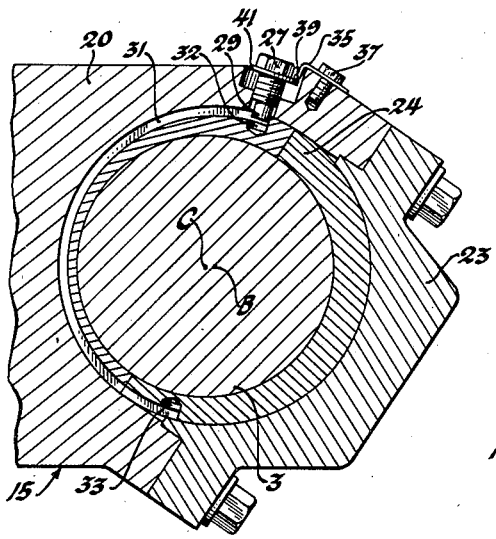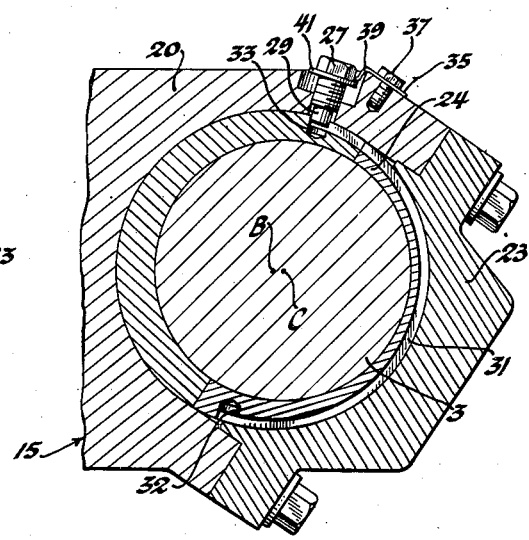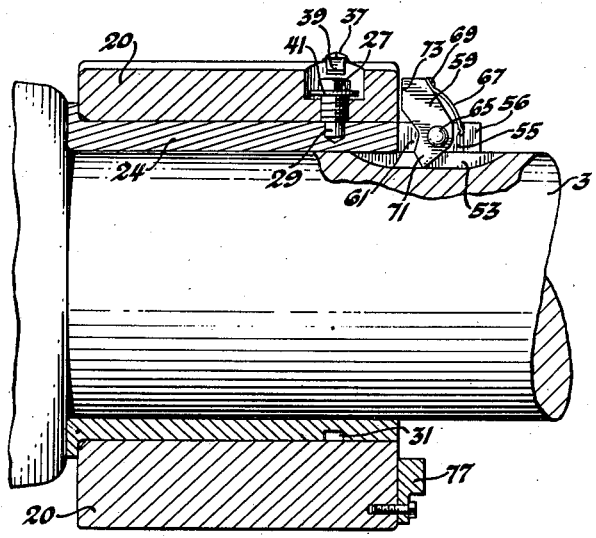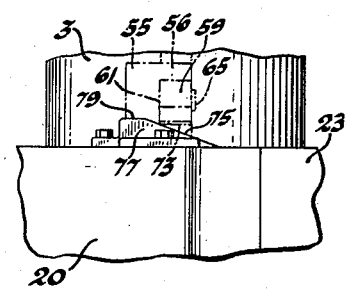

2,254,499

UNITED STATES PATENT OFFICE 2,254,499

SHIFTABLE MOUNTING FOR ELECTRIC VEHICLE MOTORS

Horace D. Seelinger, Highland Park, Mich., assignor to General Motors Corporation, Detroit, Mich., a corporation of Delaware Application January 12, 1940, Serial No. 313,523

14 Claims. (Cl. 105—136)

The present invention relates to suspension means for a traction motor and more particularly to means whereby the motor may be conveniently moved out of driving relation with a shaft driven thereby on which it is supported in geared relation.

On locomotives where a plurality of large, heavy traction motors are required, the usual practice of mounting each motor inaccessibly between a pair of driving wheels and supporting part of the weight thereof on the axle to which the motor is geared and on which the wheels are mounted makes it necessary for the locomotive to be run to the repair shop for replacement of the motors. In the event of a failure of a motor armature bearing in service the armature drops down and rubs on the pole pieces of the motor, damaging the electrical windings of the armature. Electrical protective devices are provided to isolate the motor thus damaged from the source of power, but as no means is usually provided whereby the locomotive crew can disconnect the geared connection between the motor and the axle, it is therefore necessary to run the locomotive and train at slow speed to the nearest siding where the locomotive is set out and another locomotive obtained to pull the train. The delay of the train, together with the additional damage to the armature in proceeding to the siding and on to the repair shop, may be avoided by use of a motor suspension such as shown and described in the present invention.

The principal object of the present invention is the provision of means whereby a motor which is supported on and geared to an axle may be conveniently moved out of driving relation with the axle by merely rotating the axle.

Another object is the provision of means which may be readily applied to a part of the motor suspension for engagement by the axle to rotate said means through an angle necessary to cause the motor to be moved out of driving relation with the axle.

These and other objects will be apparent by referring to the following detailed description and appended drawings, in which:

Figure 1 is a partial top plan view of a locomotive truck frame of a well known type showing my motor suspension means applied thereto;

Figure 2 is an enlarged vertical cross sectional view taken on line 2—2 of Figure 1;

Figure 3 is a vertical elevation of the truck frame and suspension means with some of the parts broken away and others in section to show certain details thereof to better advantage;

Figure 3a is an enlarged view of certain of the parts shown in Figure 3, the parts shown occupying positions different from those of Figure 2.

Figures 4 and 5 are enlarged vertical cross sectional views taken on line 4—4 of Figure 1 showing certain of the parts in different positions, Figure 4 showing the parts in position to maintain the motor in driving relation with the axle and Figure 5 showing the position of the parts with the motor moved out of driving relation with respect to the axle;

Figure 6 is an enlarged vertical cross sectional view taken on line 6—6 of Figure 2; and Figure 7 is a bottom plan view taken transverse to line 7—7 of Figure 2.

While the present motor suspension is shown in the drawings applied to a well-known type of locomotive truck for which it is particularly adapted, as pointed out previously, it is likewise applicable to various types of shaft and vehicle drives in which heavy motors are used.

When applied to a locomotive truck having a number of axles, identical suspension means are used for suspending each traction motor between each axle and a truck transom so that any motor may be moved relative to its respective axle out of driving relation therewith. Only a partial view of a locomotive truck is shown in Figures 1 and 2 with suspension means for one motor only.

The truck frame is shown at 1 in which an axle 3 is rotatably supported. Wheels 5 and a gear 7 are fixed to the axle and journal boxes 9 are shown on the ends of the axle. The frame 1 is supported on the journal boxes by springs, not shown, placed between the frame and equalizer bars 11, the ends of which are supported on journal boxes on adjacent axles of the truck in the usual manner. A transom 13 is shown extending transversely between the sides of the truck frame and pedestals, not shown, are provided to enable the journal boxes to move vertically with respect to the truck.

A dynamo-electric machine such as a traction motor 15 having a frame 16 is movably supported between the transom 13 and the axle 3. A pinion gear 17 is adapted to mesh with the gear 7 on the axle 3. The pinion gear is fixed to the end 19 of the motor armature shaft which is rotatably supported in bearings mounted in the motor frame in any well-known manner. The motor frame 16 is provided with axle bearing projections 20 and 21 on which bearing caps 23 are bolted. The bearing projections and caps are line-bored about a center indicated at B in Figures 4 and 5 and split eccentric bushings 24 and 25 are supported in each of these bores. The bushings are bored eccentrically with respect to the center B about a center indicated at C for a running fit with the axle 3 which extends through and is rotatable in the bores of the bushings. The distance between the centers B and C of the bores is selected so that simultaneous rotation of the eccentric bushings in the bores of the axle bearing projections through an angle of 180° about the center line C of the axle causes the motor to be moved parallel with respect to and away from the axle a distance necessary to demesh the motor pinion 17 from the gear 7 on the axle. When the pinion and gear are in mesh, the angular position of the bushings with respect to the bores in the bearing projections is shown in Figure 4 and when the pinion is out of mesh with the gear, as shown in Figure 3, the bushings are moved 180° from the position shown in Figure 4 to the position shown in Figure 5.

A combined motion limiting and locking mechanism shown in Figures 4, 5 and 6 is applied to each axle bearing projection to limit the angular movement of the bushings to 180° only and to lock the bushings in either of the positions shown in Figures 4 and 5. As each of these mechanisms are similar, a description of the one applied to the bearing projection 20 will suffice for both. This mechanism comprises a dowel pin 27 threaded in an opening in the upper extremity of the bearing projection 20. The inner end 29 of the dowel pin is of reduced diameter and extends into a slot 31, extending 180° around the outer periphery of the bushing. Holes 32 and 33, having a diameter equal to the width of the groove 31 and a radial depth greater than the groove, are drilled radially with respect to the bushing at either end of the groove so that the end 29 of the dowel pin 27 may be entered into either of these holes to lock the bushing 24 in either of the positions shown in Figures 4 and 5. A clamp 35 is fixed adjacent the head of the dowel pin by means of a cap screw 37 threaded in the axle bearing projection. The clamp 35 is provided with a bent end portion 39 which is contacted by a collar portion 41 formed on the head of the dowel pin when it is screwed outward to limit the outward movement thereof. When the collar 41 is brought into contact with the end 39 of the clamp, the inner end 29 of the pin will be moved outward from the bottom of either of the holes 32 or 33 at the ends of the slot 31 to allow rotation of the bushing through an angle of 180° only, as the end 29 of the dowel pin is retained in the groove 31 by the clamp 35.

The suspension means for movably supporting the motor 15 on the transom of the truck frame is best shown in Figures 1 and 3 and is of a well-known type, forming no part of the present invention. The motor frame 16 is provided with vertical spaced lugs 43 extending horizontally toward the transom 13 and the transom is provided with vertically spaced lugs 45 extending horizontally along either side of each of the lugs 43 on the motor frame. A plurality of helical compression springs 47 having bars 49 and 50 located respectively on the upper and lower ends thereof are placed between the vertically spaced lugs on both the motor and transom. The bar 49 is placed between the upper end of the springs and the upper lugs on the transom and motor and the bar 50 is placed between the lower end of the springs and the lower lugs of the motor and transom. By this arrangement any vertical movement between the transom and the motor is absorbed by the springs. The lugs 45 on the transom and the bars 49 and 50 are provided with vertically drilled holes, through which bolts 51 extend. The bolts also extend through the springs and the bars are thus capable of vertical movement only on the bolts, which causes compression of the springs. This construction allows the lugs 45 of the motor which are supported by the bars to slide transversely and longitudinally with respect to the bars and move vertically in either direction with respect to the transom lugs. The motor may thus move in any direction with respect to the truck frame 1 and is spring-suspended therefrom.

The following means are provided to connect and disconnect the bushings 24 and 25 with the axle 3 for simultaneous rotation therewith so that any motor may be moved out of driving relation with its respective axle. As best shown in Figures 1 and 6, axially aligned keyways 53 and 54 are located in the portion of the axle 3 between the two axle bearing projections 20 and 21 of the motor, while the bushings 24 and 25 are provided with axial projections 55 and 57 extending over the portions of the axle in which the keyways 54 and 53 are located. Each of the bushing projections 55 and 57 has circumferentially extending end projections, shown respectively at 56 and 58, which extend in the same direction therefrom, that is, toward the motor as shown in Figure 1. The projections on each of the bushings are therefore substantially hook-shaped in form and are located adjacent each of the aligned keyways 53 and 54. With the above structure, when it is found necessary to move the motor out of geared relation with the axle, and only then, means comprising dogs 59 and 60, which are normally carried as tools, are inserted in these hook-shaped projections. These dogs and the structures provided for mounting them on each of these projections are similar, and when the dogs are mounted thereon they are caused to enter the respective keyways 53 and 54 to cause rotation of the dogs by the axle. The dogs are thereby moved into engagement with the bushing projections, which effects rotation of the bushings to cause the motor to be moved out of geared relation with the axle. The following description will be confined to the details of one of these dogs and the mounting details therefor on one of the bushing projections, as best shown in Figures 2, 3a and 6.

The radial face 61 of the bushing projection 55 is provided with a drilled hole 63 which extends at right angles with respect to this face and all the way through the projection. This hole 63 serves to rotatably support a pivot shaft 65 on which the dog 59 is fixed. A blade spring 67 is fixed to the dog at 69, its free end resting on the circumferential projection 56 of the bushing. The spring tends to rotate the dog, and to turn the pivot shaft in the hole 63 in the bushing so that the tail 71 of the dog is biased for movement into contact with the periphery of the axle 3 and accordingly will enter the keyway 53 in the axle when it is rotated into radial alignment with the tail. With the tail of the dog resting in the bottom of the keyway, the face 73 of the dog is held slightly out of contact with the vertical face of the axle bearing projections (see Figure 6). It will be evident that rotation of the axle 3 in a clockwise direction, as viewed in Figure 2, will move the dog 59 into driving contact with the radial face 61 of the bushing projection and the bushing will accordingly be rotated with the axle. Rotation of the axle and the gear 7 clockwise exerts a torque and lifting force on the pinion 17 and the armature, which reduces the rubbing friction between the armature and the pole pieces on which it rests after a failure of the armature bearings and therefore allows the armature to rotate more freely. Slightly before the dog and bushing reach an angular position 180° from the position in which they are shown in Figure 2, the face 73 of the dog (see Figure 6) strikes the beveled end 75 of a cam 77 fixed to the vertical face of the axle bearing projection which causes the dog to be rotated about the axis of the pivot shaft 65 so that the tail 71 of the dog will be moved outward from the bottom of the keyway 53 in the axle. This cam 77 is located so that when the bushing has been rotated 180° the end of the slot 31 formed by the hole 33 in the bushing strikes the end 29 of the dowel pin 27 (see Figure 5) and the dog will have been at this time rotated sufficiently to cause the tail of the dog to be entirely removed from the axle keyway as the face 73 of the dog will have been moved outward away from the vertical face of the bearing projection along the beveled end 75 of the cam until it rests on the flat face 79 thereof (see Figures 3a and 7). The other dog 60 is mounted in a similar manner on the bushing 25 and serves to rotate it in the same direction through the same angle and is withdrawn by a similar cam, not shown, fixed on the axle box projection 21 in the same angular position as that of the cam 77 shown in Figure 2. Simultaneous rotation of the bushings through an angle of 180°, as has been previously explained, causes movement of the motor away from and parallel with respect to the axle a distance sufficient to demesh the pinion 17 from the gear 7 which then allows the axle to rotate with respect to the pinion 7.

Referring now to Figure 2, it will be observed that with the parts in the position shown, counterclockwise rotation of the shaft will cause the dog to be moved away from the radial surface of the bushing projection; that is, the dog and the pivot shaft thereof will be moved axially with respect to the center line of the hole 63 in the bushing projection and will move tangentially with respect to the periphery of the axle a distance sufficient to cause the tail of the dog to be withdrawn from the keyway in the axle as the bushing is prevented from rotating counterclockwise by the dowel pin which is now in contact with the end of the slot 31 formed by the hole 33 as best shown in Figure 5. The length of the pivot shaft is such that when the dog has been moved away from the bushing projection and out of the keyway of the axle the pivot shaft will be still retained in the hole in the bushing projection and will accordingly be still supported therein and will therefore be prevented from falling down in the space between the axle and the motor where it would cause damage.

The mounting details of the dogs on the bushings are such that the bushings are rotated in the proper direction to expedite movement of the motor away from the axle for disengaging the pinion from the gear and should the axle be caused to rotate in the opposite or improper direction by mistake the dogs will be moved with respect to the bushings and out of the keyways in the axle, but will still be supported on the bushings.

It will be evident from the above description that should it become necessary to disconnect a motor from the axle to which it is geared and on which it is supported, the locomotive engineer may, by means of a wrench, loosen the dowel pins, insert the dogs in the bushings, and then by merely running the locomotive a short distance in the proper direction by means of the other motors cause the motor to be moved out of driving relation with the axle. With this motor mounting structure, therefore, the locomotive need only be run a short distance from the point at which a failure occurs to disconnect a motor and then upon removal of the dogs and retightening the dowel pins the locomotive is ready to proceed with its train at unrestricted speed to its destination.

I claim:

1. In a device of the type described comprising, a frame, a shaft rotatably mounted in the frame, a gear on the shaft, a dynamoelectric machine having a rotatable armature shaft, a pinion gear fixed to said armature shaft adapted to mesh with said first named gear, said dynamoelectric machine being movably mounted on said frame and having a bearing projection thereon, said bearing projection including a bore and an eccentric bushing therein through which said first named shaft extends, and attachable means for connecting said bushing to said first named shaft to cause said shaft to rotate said bushing when it is desired to move said dynamoelectric machine out of geared relation with respect to said first-named shaft.

2. Suspension means for a dynamoelectric machine comprising, a frame, an axle rotatably mounted therein, a gear on said axle, a dynamoelectric machine including a rotatable armature shaft, a pinion fixed thereto adapted to mesh with the gear on said axle, said machine being movably supported on said frame and having a bearing projection thereon, said bearing projection having a bore therein, an eccentric bushing in said bore through which said axle extends, means for connecting said bushing to said machine to prevent respective movement of said bushing with respect to said bore, said means being releasable to allow rotation of said bushing with respect to said bore, and attachable means for connecting said bushing at times to said axle for rotation thereby to move said dynamoelectric machine out of geared relation with said axle when said bushing is disconnected from said machine.

3. In a device of the type described comprising a frame, an axle rotatably supported in said frame, a gear on said axle, a dynamoelectric machine having a rotatable armature shaft, a pinion gear thereon normally in mesh with the gear on said axle, said machine being movably supported on said frame and having a journaled connection with said axle, said journaled connection comprising a bearing projection on said machine provided with a bore, an eccentric bushing in said bore through which said axle extends, attachable means for connecting said bushing to said axle for rotation thereby in one direction through an angle necessary to move said pinion out of mesh with said gear, and manually operable means for connecting said bushing to said machine to prevent rotation thereof, but releasable to enable said bushing to be rotated with the axle by said first named means.

4. In a device of the type described comprising, a frame, an axle rotatably mounted in the frame, a gear fixed on said axle, a dynamoelectric machine having an armature shaft rotatably mounted therein, a pinion fixed to said shaft normally meshing with the gear on said axle, said machine being movably supported on said frame and having a bearing connection with said axle, said bearing connection comprising a bearing projection on said machine having a bore therein and an eccentric bushing rotatable in the bore and through which the axle extends and means readily attachable at will for connecting said bushing to said axle for limited one way rotation therewith to move said pinion out of mesh with said gear.

5. In a device of the type described, a frame, an axle rotatably mounted in said frame, a gear on said axle, aligned keyways in said axle, a dynamoelectric machine including a revolving armature shaft, a pinion gear fixed thereto normally meshing with the gear on said axle, lugs integral with said machine movably mounted on said frame, bearing projections integral with said machine having aligned bores and eccentric bushings rotatably mounted in said bores through which said axle extends, said bushings provided with axial projections having holes extending at right angles to the center line of the axle, means pivoted in said holes on one side of said bushing projections for engagement by said keyways in said axle to move said bushings angularly in one direction to cause said pinion gear to be moved out of mesh with the gear on said axle, said means being moved axially with respect to said holes in said bushing projections and tangentially with respect to said axle to disengage said means from said axle keyways when said axle is rotated in the opposite direction, and means located on said bearing projections contactable by said first named means for causing angular rotation thereof about the axis of said holes to disengage said last named means from said keyways to limit the angular movement of said bushings.

6. A traction motor suspension means of the type described comprising, a truck frame, an axle rotatably guided in said frame, a gear fixed to said axle, aligned keyways in said axle, a traction motor having an armature shaft rotatably mounted therein, a pinion gear on said shaft adapted to mesh with said gear on said axle, lugs projecting from said motor movably mounted on said truck frame and bearing projections on said motor having aligned bores therein, eccentric bushings carried in said bores in said bearing projections through which said axle extends, hook-shaped projections on said bushings, openings in said hook-shaped projections extending therethrough at right angles to the center line of the axle, dogs having pivot shafts insertible in one end of said openings, springs fixed to said dogs and bearing on said hook-shaped projections for biasing said dogs into engagement with said axle keyways, and cam means fixed on said bearing projections in a position whereby they are contacted by said dogs to move said dogs out of said keyways when said bushings have been moved angularly an amount necessary to move said pinion gear out of mesh with the gear on said axle.

7. A traction motor suspension for a locomotive vehicle comprising, a truck frame, an axle rotatably guided therein, wheels on said axle, a gear fixed to said axle, a keyway in said axle, a traction motor movably mounted on said truck frame and having a rotatable armature shaft, a pinion fixed thereto adapted to mesh with said gear on said axle, a bearing projection on said motor supported on said axle, said bearing projection including a bore, an eccentric bushing therein through which said axle extends, a combined motion limiting connection and connecting mechanism between said bore and said bushing disconnectable to allow limited relative angular movement of said bushing with respect to said bore necessary to cause the pinion to be moved from its meshed to its demeshed position with respect to said gear and connectable to hold said bushing in either of these angular positions, means connectable to said bushing and biased for movement with respect thereto into engagement with the keyway in said axle for causing said bushing to be rotated by said axle in the proper direction to move said pinion out of mesh with said gear, and means contactable by said first named means for moving said first named means relative to said bushing and said axle out of said keyway when said pinion is moved out of mesh with said gear on said axle to allow relative rotation thereof with respect to said pinion.

8. In a motor vehicle, an axle, a motor geared to the axle, means to mount the motor on the axle, eccentric bushings in said means, and means actuated by the axle to rotate said bushings to cause the disengagement of the geared connection of the motor with the axle.

9. In a motor vehicle, a rotatable axle, a motor geared to the axle, movable motor supporting and positioning means carried by said axle, and means attachable to said first named means and to the axle for actuation by the axle to move the supporting means to cause the disengagement of the geared connection of the motor with the axle.

10. In a motor vehicle, a frame, a driving and supporting axle rotatably mounted in the frame, a motor geared to said axle and movably mounted on said frame, movable motor supporting means carried by said axle, and means to interconnect the movable supporting means to the axle for movement thereby to cause the motor to be moved out of geared relation with the axle.

11. In a motor vehicle, a rotatable axle having a gear, a driving motor having a gear meshing normally with the gear on the axle, movable motor supporting means on said axle normally maintaining said motor in geared driving relation with said axle, and motion transmitting means adapted when applied between said axle and said motor supporting means to cause limited movement of said motor supporting means to move said motor out of geared driving relation with said axle.

12. In a motor vehicle, a rotatable driving and supporting axle, a motor geared to said axle, motor supporting means carried on said axle, axle connecting and disconnecting means normally detached from said axle, means to attach said connecting and disconnecting means to said supporting means to connect said motor supporting means to said axle for actuation thereby to cause said motor to be moved by said supporting means out of geared relation with the axle.

13. In a motor vehicle, a rotatable driving and supporting axle, a driving motor, a geared connection between the motor and axle, a cam on said motor, supporting means located between said motor and axle, said means being movable with respect to the motor to cause the motor to move from a given position in which said motor is maintained in geared relation with said axle to a position in which said motor is moved entirely out of geared relation with the axle, combined motion limiting and locking means on said motor engageable by said supporting means when said motor is moved to either of said positions, and releasable motion transmitting means adapted to be inserted between said supporting means and said axle and engageable by portions of said supporting means and said axle upon rotation of the axle to cause limited movement of said motion transmitting means and of said supporting means to cause the motor to be moved out of geared relation with the axle, the movement of said releasable motion transmitting means causing contact to be made with said cam to release said motion transmitting means from said rotating axle, said release taking place when said motor is moved entirely out of geared relation with the axle.

14. In a device of the type described comprising, a frame, bearing members in said frame, each bearing member having a bore, an eccentric bushing in each bore, an axle rotatable in said bushings, a gear fixed on said axle, a dynamoelectric machine carried in said frame and having a rotatable armature shaft, a pinion gear fixed to said shaft and normally meshing with said gear on the axle, a motion limiting connection between said bore and said bushing to limit angular movement of said bushing in said bore to an amount necessary to cause movement of said machne out of geared relation with said axle, attachable means for connecting said bushing to said axle to cause angular movement of said bushing within the limits permitted by said motion limiting connection, and means fixed to said machine and contactable by said attachable means and operable to disconnect said axle from said bushing upon angular movement of said axle.

HORACE D. SEELINGER.